Figure 1:
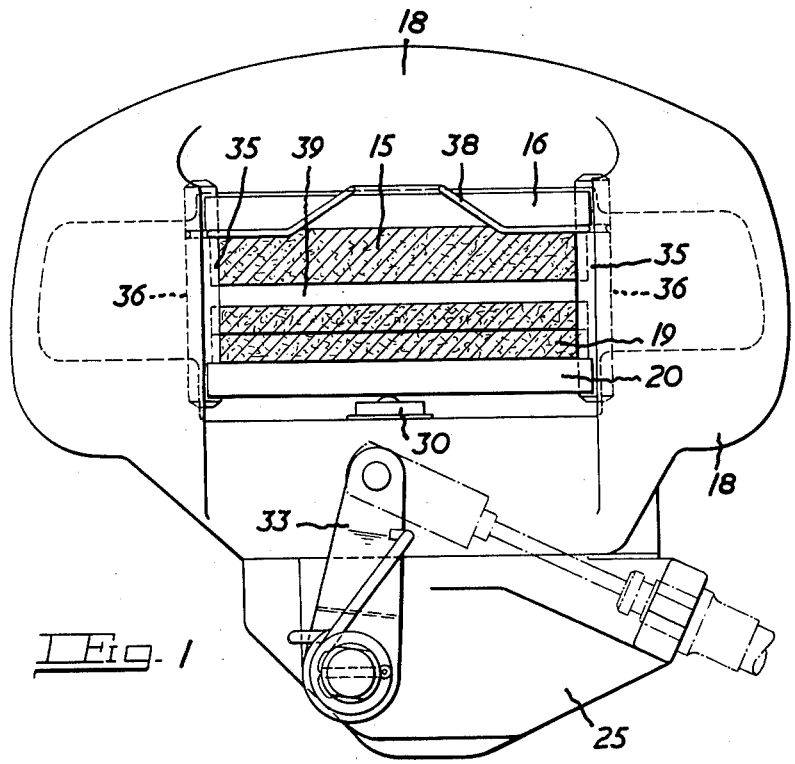

June 14, 1966  A. W. HARRISON  3,255,848
DISC BRAKES

Filed June 11, 1964  4 Sheets-Sheet 1

ANTHONY W. HARRISON
By: Scrivener Parker Scrivener and Clarke

ANTHONY W. HARRISON
By: Scrivener, Parker, Scrivener and Clarke

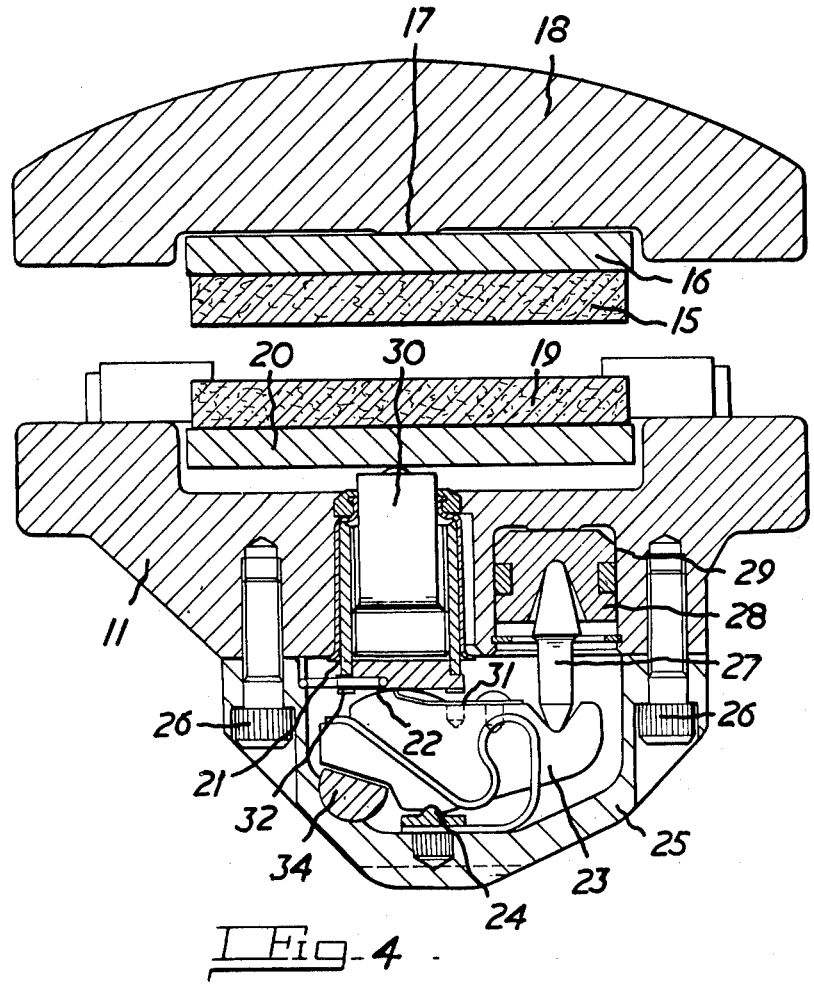

ANTHONY W. HARRISON

By Scrivener Parker Scrivener and Clarke

United States Patent Office 3,255,848
Patented June 14, 1966

3,255,848
DISC BRAKES
Anthony William Harrison, Selly Oak, Birmingham, England, assignor to Girling Limited, Tyseley, England, a British company
Filed June 11, 1964, Ser. No. 374,418
Claims priority, application Great Britain, June 12, 1963, 23,363/63
2 Claims. (Cl. 188—73)

This invention relates to improvements in disc brakes of the kind in which friction pads are brought into engagement with opposite faces of rotatable disc, the friction pads being mounted in a caliper or housing which straddles a portion of the periphery of the disc.

In a disc brake of that kind a friction pad or a rigid backing plate by which it is carried is usually engaged by a flat surface of substantial area on a piston or other actuator by which the pad is applied to the disc or by a flat surface of similar area which may be equal to the area of the pad or backing plate in the case of a non-actuated pad.

The pad is constrained to a desired wear pattern when the brake is applied but in the off position the pad cannot accommodate the movements of the plane of the braking surface of the disc relative to the caliper due to axle irregularities caused by deflections due to loading and movements to take endwise clearance, thermal coning of the disc, or tolerance variations. A considerable increase in running clearance is required to minimise these effects.

Another disadvantage of the usual arrangement is that when the brake is applied with the disc in the coned condition due to heating the pad is subjected to uneven wear. For example, the radially outermost portion of the pad may be held in full engagement with the disc while the radially innermost portion is clear of the disc or only in light contact with it.

According to our invention these difficulties are overcome by providing only a small area of contact between a friction pad or its backing plate and an actuating member or support for the friction pad, the position of the centre of pressure of the area of contact corresponding substantially to the position of the centre of pressure of the friction pad or backing plate, and the size of the area of contact being chosen so that the friction pad is constrained to follow a predetermined wear path whilst being permitted to articulate out of its normal plane to accommodate deflections of the disc.

The area of contact may be flat or concave and may be of substantially the same shape as the shape of the friction pad or backing plate. Alternatively the area of contact may be of a different shape provided that the ratio between the circumferential dimension of the friction pad or backing plate and the corresponding axis of the area of contact is substantially equal to the ratio between the radial dimension of the friction pad or backing plate and the other axis of the area of contact.

Preferably the length of the axis of the area of contact which corresponds to the circumferential dimensions of the friction pad or backing plate is between 15% and 25% of circumferential dimension of the friction pad or backing plate and the length of the axis of the area of contact which corresponds to the radial dimension of the friction pad or backing plate is between 15% and 25% of the radial dimension of the friction pad or backing plate.

Figure 2:
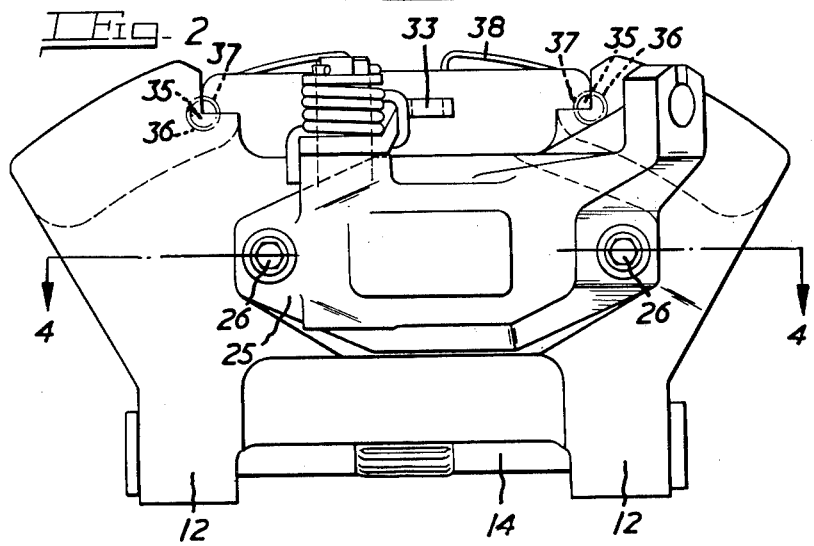
Figure 3:
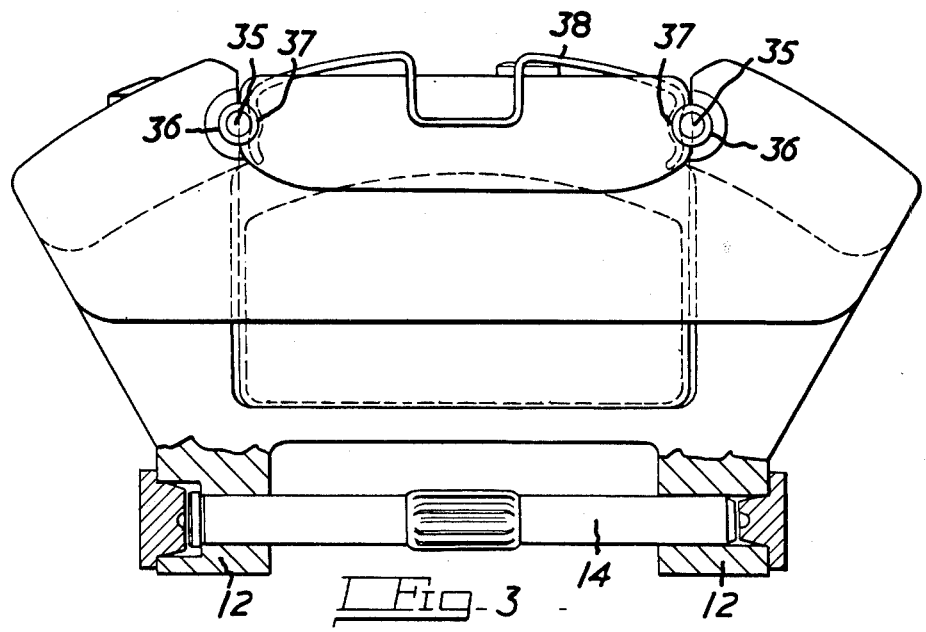
Figure 5:
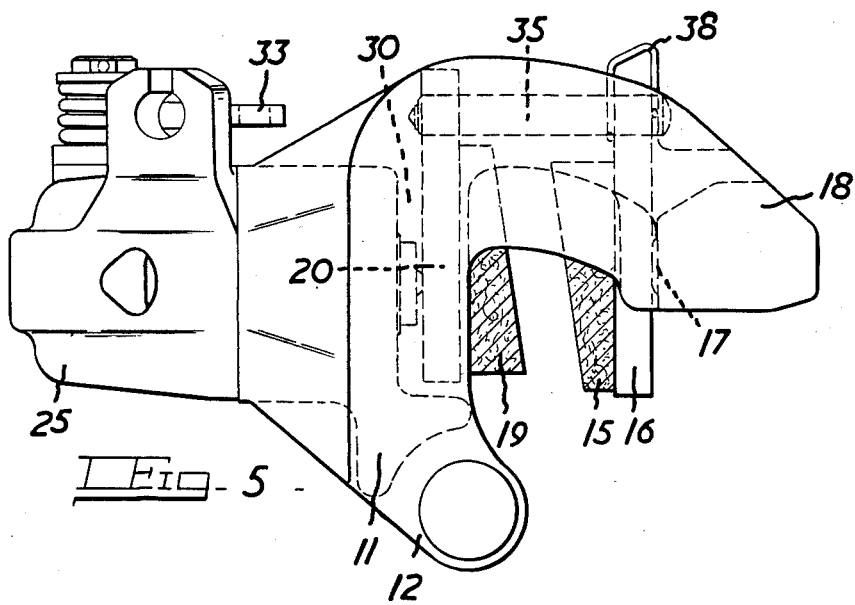
Figure 6:
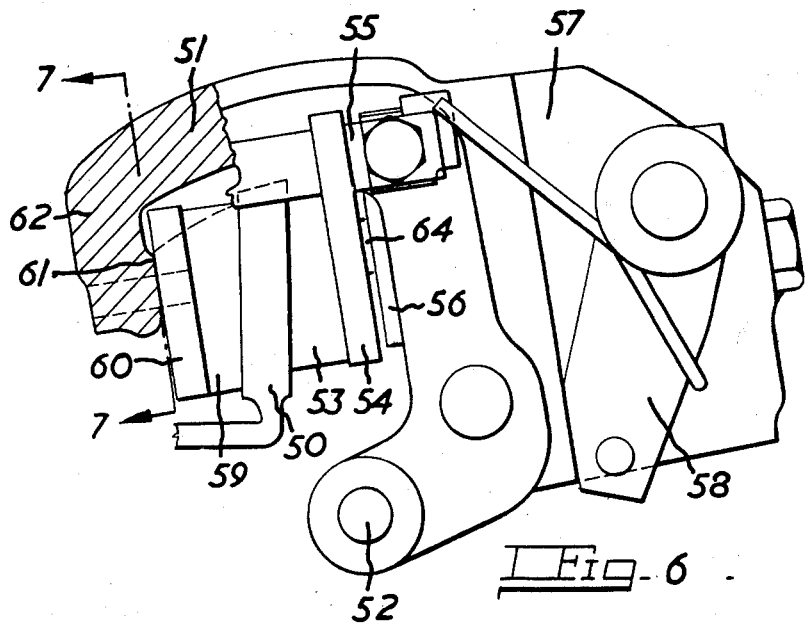
Figure 7:
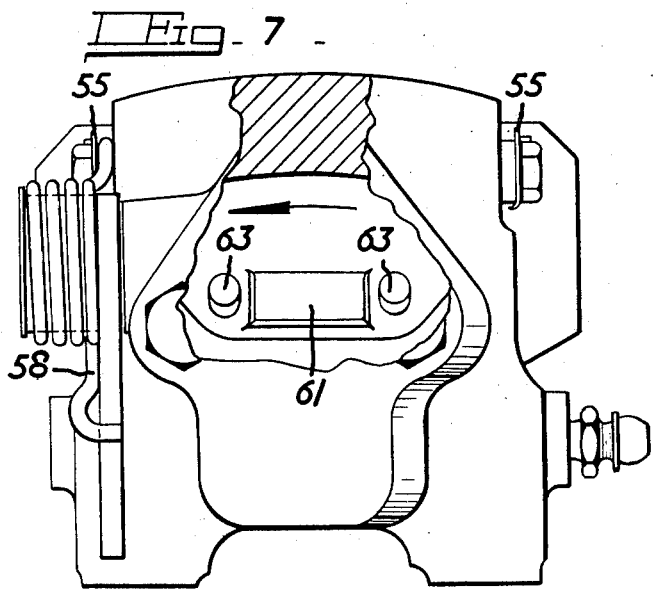

Two embodiments of disc brake incorporating our invention are illustrated in the accompanying drawings in which:

FIGURE 1 is a plan of one form of brake;
FIGURE 2 is an end elevation of the brake shown in FIGURE 1;
FIGURE 3 is an end elevation from the opposite end;
FIGURE 4 is a section substantially on the line 4—4 of FIGURE 2;
FIGURE 5 is a side elevation of the brake shown in FIGURE 1;
FIGURE 6 is a side elevation of a similar form of brake showing a modification; and
FIGURE 7 is an end elevation including a fragmentary section on the line 7—7 of FIGURE 6.

In the brake illustrated in FIGURES 1-5, 10 is a caliper adapted to straddle a portion of the periphery of a disc (not shown) rotatable with a vehicle wheel. One limb 11 of the caliper is extended inwardly to form two spaced lugs 12 which receive a spindle 14 fixed in a non-rotatable part of the vehicle and providing an axis substantially at right angles to the axis of the disc about which the caliper is adapted to swing.

One face of the disc is adapted to be engaged by a friction pad 15 carried by a rigid backing plate 16, the pad assembly being located between the disc and a protuberance 17 on the inner face of the other limb of the caliper.

The other face of the disc is adapted to be engaged by a friction pad 19 carried by a rigid backing plate 20, the pad being located between the disc and a plunger 21 slidably mounted in the limb 11 of the caliper for movement in a direction parallel to the axis of the disc. At its inner end the plunger 21 is adapted to be engaged by a cam surface 22 on the inner side of a rocking lever 23 which fulcrums on its outer side on a boss 24 fixed in the end of a cap 25 detachably secured to the limb 11 of the caliper by bolts 26. On its inner side and at one end the lever 23 is in rocking engagement with a dolly 27 actuated by a piston 28 working in an hydraulic cylinder 29 in the limb 11 of the caliper.

When liquid under pressure is supplied to the cylinder 29 the piston 28 through the dolly 27 rocks the lever about its fulcrum 24 and the cam 22 applies the friction pad 19 to the disc through the plunger 21. The reaction on the caliper swings the caliper about its pivot 14 and the friction pad 15 is urged into engagement with the opposite face of the disc by the engagement of the protuberance 17 with its backing plate 16. The plunger 21 is preferably formed as shown in FIGURE 4 by an outer sleeve slidably guided in the caliper and a co-axial inner sleeve 30 of which the outer end engages with the backing plate 20 and which is in screw-threaded engagement with the outer sleeve. A spring pawl 31 mounted on the rocking lever 23 engages with ratchet teeth 32 on the periphery of the sleeve so that when the angular movement of the lever 23 in the application of the brake exceeds a predetermined value owing to wear on the friction pads the outer sleeve is rotated to increase the effective length of the assembly formed by it and the inner sleeve 30.

If it is desired to apply the brake mechanically from a hand-lever for parking or emergency braking the hand-lever may be coupled to an arm 33 or a cam 34 rotatably mounted in the caliper and bearing on the end of the rocking lever 23 remote from the hydraulic actuator.

The torque on the friction pads in the application of the brake is taken by abutments comprising pins 35 slidably received in axial recesses 36 in the caliper on opposite sides of an opening 39 in the radial outer side of the caliper and engaging with co-operating recesses 37 in the ends of the backing plates 20 and 16. The friction pads are permitted a small movement in a circumferential direction when the brake is applied so that the torque on the friction pads is taken by the pin at the rearward end of the backing plates, that is the end of the backing plate opposite to which any given point of the braking surface of the disc first comes into alignment. This allows the friction pads to rock or articulate about the protuberance 17 and the point of engagement with the plunger 21 or sleeve 30 to accommodate deflections of the disc and to ensure substantially uniform wear of the pads over the whole of their area.

The areas of contact formed by the protuberance and the plunger or sleeve respectively are substantially the same shape as the friction pads themselves and the length of the major and minor axes of the areas of contact are approximately equal to 20% of the circumferential and radial dimension of the friction pads.

The areas of contact may be flat or concave in which case the engagement takes place around the crater edges and the areas lie within the centres of pressure of the friction pads so that constraint for suitable wear is provided.

The pins 35 are secured in the recesses by a spring clip 38 of substantially U section of which opposite ends are received in grooves in the pins on opposite sides of the backing plate 16. When the spring clip 38 is removed the pins 35 can be removed from the caliper and the friction pads with their backing plates can be withdrawn and inserted in a plane parallel to the plane of the disc through the opening 39 in the radial outer side of the caliper.

The friction pads 19, 15 may be parallel sided but as illustrated, the pads are of tapered thickness, the tapering being in such a direction that as the pads wear the angle between the backing plate and the plane of the disc becomes progressively less and the pads have a larger working life. This has the additional advantage that as the pads wear, there is a minimum radial displacement of the pads relative to the disc so that the radial width and position of the braking path on the disc is not appreciably changed.

In the disc brake illustrated in FIGURES 6 and 7, 50 is a disc rotatable with a vehicle wheel. A portion of the outer periphery of the disc is straddled by a caliper 51 which is adapted to swing about an axis 52 substantially at right angles to the axis of the disc.

A friction pad 53 adapted to engage one face of the disc is carried by a rigid backing plate 54 guided on detachable torque-taking members 55 for movement towards and away from the disc. The torque-taking members engage with upstanding ears or lugs on the backing plate 54. The friction pad is urged into engagement with the disc by a piston 56 working in an hydraulic cylinder (not shown) in one limb 57 of the caliper for normal service braking and by mechanical means 58 for parking and emergency braking. A second friction pad 59 mounted on a backing plate 60 is located in the caliper on the opposite side of the disc and is urged into engagement with the opposite face of the disc by the reaction on the caliper. This rocks the caliper about its axis 52 and the friction pad 59 is applied to the disc by an abutment 61 on the second limb 62 of the caliper bearing on the backing plate 60.

The abutment 61 is formed by a protuberance located between spaced pins 63 fixed in the limb 62 and which co-operate with holes in the backing plate 60 and take the torque on the friction pad 59 when the brake is applied. The holes are of a size which permit the pad 59 to rock or articulate out of its normal plane when the brake is applied or in the off position to accommodate deflection of the disc and to ensure substantially uniform wear over the whole of its area.

The friction pad 53 may be applied to the disc by the direction mechanical engagement of the piston over the whole of its area or as illustrated the piston engages with the backing plate 54 through a protuberance 64 on the end of the piston. The directly actuated pad 53 is then also permitted to rock or articulate to accommodate deflections of the disc and to ensure substantially uniform wear over the whole of its area.

The protuberances for the friction pads are substantially the same size and shape and are located in substantially the same position as the protuberance in the brake described above and as illustrated in FIGURE 6.

The friction pads can be removed from the caliper in a circumferential direction after removal of one or both of the torque-taking members 55 and detaching the backing plate 60 from its co-operating with the torque-taking pins 63.

In both the embodiments described above the protuberances or small contact areas may be formed as a protuberance on the backing plate itself which engages with a flat surface on the caliper in the case of the non-actuated pad or a flat surface on the actuating member in the case of the directly actuated pad.

In the embodiments described above I have described swinging calipers but it is to be understood that the present invention is applicable to disc brakes of the kind in which a caliper is adapted to slide in a direction parallel to the axis of the disc and one friction pad is urged into engagement with an adjacent face of a rotatable disc by hydraulic or mechanical means housed in one limb of the caliper, the other friction pad being brought into engagement with the opposite face of the disc by the reaction on the caliper of the actuating means. Furthermore the present invention is also applicable to disc brakes of the kind in which a stationary caliper straddles a portion of the periphery of a rotatable disc and friction pads located in the caliper are adapted to be urged into engagement with opposite faces of the disc by hydraulic or mechanical actuating means housed in opposed limbs of the caliper.

In any of the forms of brake described above the small areas of contact may be formed as four independently raised boss portions located at the corners of rectangles or at the ends of the major and minor axes for configurations other than which are rectangular. These bosses can be formed on the caliper itself and on the actuating member or on the backing plates themselves in the case of the swinging or sliding caliper. Similarly in the stationary caliper construction the bosses can be formed on the actuating means housed in opposed limbs of the caliper or on the backing plates themselves.

I claim:

1. A disc brake comprising a rotatable brake disc, a caliper straddling a portion of the periphery of the disc and mounted to swing about an axis substantially at right angles to the axis of the disc, a first friction pad assembly mounted in the caliper on one side of the disc for movement towards and away from the disc, actuating means for said first friction pad assembly comprising an hydraulic cylinder and piston located in the caliper and offset from the centre of pressure of the friction pad assembly, a rocking lever, an engagement between said piston and one end of the lever, a plunger slidably mounted in the caliper for movement in a direction parallel to the axis of the disc, an engagement between the other end of said lever and the outer end of said plunger, a protuberance of small area on the inner end of said plunger, and an engagement between said protuberance and said first friction pad assembly, a second friction pad assembly mounted in the caliper on the other side of the disc, a protuberance of small area on the caliper engaging said second friction pad assembly whereby said second friction pad assembly is applied to the disc when the caliper is swung about its pivot by the reaction on the caliper of the actuating means for the first friction pad assembly, and abutments in said caliper to take the drag on the friction pad assemblies when the brake is applied, said abutments permitting both assemblies to rock out of their normal planes to accommodate deflection of the disc.

2. A disc brake as in claim 1 further incorporating a cam co-operating with said lever for application of the brake independently of said hydraulic cylinder and piston.

(References on following page)

References Cited by the Examiner

UNITED STATES PATENTS

| | | | |
|---|---|---|---|
| 2,351,041 | 6/1944 | Hawley | 188—73 X |
| 2,365,369 | 12/1944 | Williams | 188—73 |
| 2,655,229 | 10/1953 | Eksergian | 188—73 X |
| 2,768,710 | 10/1956 | Butler | 188—152 X |
| 2,777,540 | 1/1957 | Bachman | 188—73 |
| 2,862,580 | 12/1958 | Burnett | 188—73 |
| 2,937,722 | 5/1960 | Ruet | 188—73 |
| 2,953,221 | 9/1960 | Lucien | 188—73 |
| 2,968,370 | 1/1961 | Ruet | 188—73 |

FOREIGN PATENTS 728,709    4/1955    Great Britain.

MILTON BUCHLER, *Primary Examiner.*

G. E. A. HALVOSA, *Assistant Examiner.*